(12) United States Patent
Shao

(10) Patent No.: US 11,188,612 B2
(45) Date of Patent: Nov. 30, 2021

(54) LINK REQUEST PROCESSING METHOD AND APPARATUS

(71) Applicant: Advanced New Technologies Co., Ltd., Grand Cayman (KY)

(72) Inventor: Xinpeng Shao, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 197 days.

(21) Appl. No.: 16/019,812

(22) Filed: Jun. 27, 2018

(65) Prior Publication Data

US 2018/0314708 A1 Nov. 1, 2018

Related U.S. Application Data

(63) Continuation of application No. PCT/CN2016/110098, filed on Dec. 15, 2016.

(30) Foreign Application Priority Data

Dec. 28, 2015 (CN) .......................... 201511001035.8

(51) Int. Cl.
*G06F 16/958* (2019.01)
*G06F 16/955* (2019.01)
(Continued)

(52) U.S. Cl.
CPC ............ *G06F 16/958* (2019.01); *G06F 9/445* (2013.01); *G06F 16/955* (2019.01); *G06F 16/9577* (2019.01)

(58) Field of Classification Search
CPC .. G06F 16/955; G06F 16/958; G06F 16/9577; G06F 9/445
See application file for complete search history.

(56) References Cited

U.S. PATENT DOCUMENTS 5,802,299 A * 9/1998 Logan ................. G06F 16/9577
709/218
2004/0226459 A1 11/2004 Hill et al.
(Continued)

FOREIGN PATENT DOCUMENTS

CN 1941785 4/2007
CN 101115050 1/2008
(Continued)

OTHER PUBLICATIONS

International Search Report by the International Searching Authority issued in International Application No. PCT/CN2016/110098 dated Mar. 16, 2017; 10 pages.
(Continued)

*Primary Examiner* — Azizul Choudhury
(74) *Attorney, Agent, or Firm* — Fish & Richardson P.C.

(57) ABSTRACT

A link request for a service is received. The link request includes an action parameter associated with an action that is to be executed in response to the link request. A determination is made as to whether the link request includes a service module identifier associated with a service provider that provides the service. In response to determining that the link request includes the service module identifier, a target page is determined and a link handler is generated. The target page is determined based on the service module identifier and the action parameter. The link handler is generated based on the service module identifier and the action parameter. The link handler is configured, when executed, to retrieve the target page. The link handler is executed based on the action parameter to retrieve the target page.

20 Claims, 5 Drawing Sheets

(51) Int. Cl.
*G06F 16/957* (2019.01)
*G06F 9/445* (2018.01)

(56) References Cited

U.S. PATENT DOCUMENTS

| | | | | |
|---|---|---|---|---|
| 2006/0229054 | A1* | 10/2006 | Erola | H04M 1/24 |
| | | | | 455/403 |
| 2007/0079000 | A1 | 4/2007 | Yoon et al. | |
| 2007/0214449 | A1 | 9/2007 | Choi et al. | |
| 2010/0199169 | A1 | 8/2010 | Gnech et al. | |
| 2010/0317374 | A1 | 12/2010 | Alpert et al. | |
| 2011/0055683 | A1* | 3/2011 | Jiang | G06F 16/957 |
| | | | | 715/234 |
| 2017/0093651 | A1* | 3/2017 | Mohammad | H04L 67/00 |

FOREIGN PATENT DOCUMENTS

| | | |
|---|---|---|
| CN | 101141694 | 3/2008 |
| CN | 101266623 | 9/2008 |
| CN | 102169486 | 8/2011 |
| CN | 102651017 | 8/2012 |
| CN | 102902785 | 1/2013 |
| CN | 104216911 | 12/2014 |
| CN | 104598513 | 5/2015 |
| CN | 104618412 | 5/2015 |
| CN | 104714980 | 6/2015 |
| JP | 2010510757 | 4/2010 |
| KR | 100377189 | 3/2003 |

OTHER PUBLICATIONS

European Extended Search Report in European Application No. 16880959.8, dated Dec. 11, 2018, 9 pages.
Kikaineko, "A Strange adventure in JavaScript Leam Easily—Delve into JavaScript function calls," Masori Dasaibation of Javascript, Nikkei Software, Nikkei BP, Jul. 24, 2014, 17(14):132-137 (with Machine Translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Preliminary Report on Patentability in International Application No. PCT/CN2016/110098 dated Jul. 3, 2018; 12 pages.
Liu, "Research and Implementation of Web Crawler for URL-Specified Crawling of AJAX-Based Web Application," China Master's These Full-text Database (Information Technology), Mar. 2013, 71 pages (with English abstract).

* cited by examiner

LINK REQUEST PROCESSING METHOD AND APPARATUS

This application is a continuation of PCT Application No. PCT/CN2016/110098, filed on Dec. 15, 2016, which claims priority to Chinese Patent Application No. 201511001035.8, filed on Dec. 28, 2015, and each application is hereby incorporated by reference in its entirety.

TECHNICAL FIELD

The present disclosure relates to the field of mobile network technologies, and in particular, to a link request processing method and apparatus.

BACKGROUND

With continuous advancement of technologies, smartphones have become an integral part of people's life. People can use smartphones to listen to music, browse the Internet, watch videos, etc. When browsing a web page through a browser, a user can click a title to read, using a link to jump to the corresponding web page.

Currently, a link is mainly processed through hardcoding. That is, some fields are written into a link through hardcoding, and a link request is introduced to a related service module based on those fields to open a corresponding web page. Specifically, a link request processing procedure in an existing technology can include: S101, a link distribution module receives a link request to be processed. S102, the link distribution module queries a predetermined coupling file, determines a service module corresponding to the link request based on hardcoded content in the link request and the coupling file, and obtains a header file corresponding to the service module. S103, the link distribution module generates a corresponding link handler based on the header file of the service module. S104, the link distribution module invokes the link handler to process the link. For example, assume that a link request for opening a news details page is received from a news application. A link format is specified as newsapp://newsapp/?page=newsdetail&newsid=news1, a page presentation module corresponding to the news details page is newsdetail. As described in NewsDetail.h, a link handling module needs to determine that when a page value is newsdetail, a service module NewsDetail is used to process the link.

However, there are technical problems when a link is processed through hardcoding: 1. The link distribution module needs to query the predetermined coupling file before determining the corresponding service module, and read the header file of the service module before generating the corresponding link handler. As such, a processing procedure can be complicated. 2. Because hardcoding fixes parsing logic, the coupling file needs to be readjusted for newly added services, hence cannot adapt to the newly added services.

SUMMARY

The present disclosure is to resolve at least one of the technical problems in related technologies to some extent. Therefore, one objective of the present disclosure is to propose a link request processing method. The method can resolve a problem that a link request processing procedure during hardcoding can be complicated, and a coupling file does not need to be readjusted for newly added services. Operations are simplified and made convenient.

A second objective of the present disclosure is to propose a link request processing apparatus. A third objective of the present disclosure is to propose a link generation method. A fourth objective of the present disclosure is to propose a link generation apparatus.

To achieve the previous objective, an implementation in a first aspect of the present disclosure proposes a link request processing method, including: receiving a link request, where the link request includes a service module parameter and an action parameter, and generating a corresponding link handler based on the service module parameter; and controlling the link handler to perform page jumping to a target page based on the action parameter.

Based on the link request processing method in the implementation of the present disclosure, the link request is received, the corresponding link handler is generated based on the service module parameter in the link request, and the link handler is controlled to perform page jumping based on the action parameter, to jump to the target page. Therefore, the problem that a link request processing procedure can be complicated during hardcoding is resolved, and a coupling file does not need to be readjusted for newly added services. Operations are simplified and made more convenient.

An implementation in a second aspect of the present disclosure proposes a link request processing apparatus, including: a link request receiving module, configured to receive a link request, where the link request includes a service module parameter and an action parameter; a generation module, configured to generate a corresponding link handler based on the service module parameter; and an execution module, configured to control the link handler to perform page jumping to a target page based on the action parameter. The link request processing apparatus in the implementation of the present disclosure receives the link request, generates the corresponding link handler based on the service module parameter in the link request, and controls the link handler to perform page jumping based on the action parameter, to jump to the target page. Therefore, the problem that a link request processing procedure can be complicated during hardcoding is resolved, and a coupling file does not need to be readjusted for newly added services. Operations are simplified and made more convenient.

An implementation in a third aspect of the present disclosure proposes a link generation method, including: obtaining a service module name of a service module including a target page and an action parameter corresponding to the target page; and generating a link corresponding to the target page based on the service module name and the action parameter.

Based on the link generation method in the implementation of the present disclosure, the service module name of the service module including the target page and the action parameter corresponding to the target page are obtained, and the link corresponding to the target page is generated based on the service module name and the action parameter, so that the corresponding link can be automatically generated for the target page. Operations are made convenient and simplified.

An implementation in a fourth aspect of the present disclosure proposes a link generation apparatus, including: an acquisition module, configured to obtain a service module name of a service module including a target page and an action parameter corresponding to the target page; and a generation module, configured to generate a link corresponding to the target page based on the service module name and the action parameter.

The link generation apparatus in the implementation of the present disclosure obtains the service module name of the service module including the target page and the action parameter corresponding to the target page, and generates the link corresponding to the target page based on the service module name and the action parameter, so that the corresponding link can be automatically generated for the target page. Operations are made convenient and simplified.

DESCRIPTION OF EMBODIMENTS

Implementations of the present disclosure are described in detail below. Examples of the implementations are illustrated in the accompanying drawings. Reference signs that keep the same or similar from beginning to end represent the same or similar elements or elements with same or similar functions. The implementations described below with reference to the accompanying drawings are examples and are intended to explain the present disclosure, but should not be construed as a limitation on the present disclosure.

Figure 1:
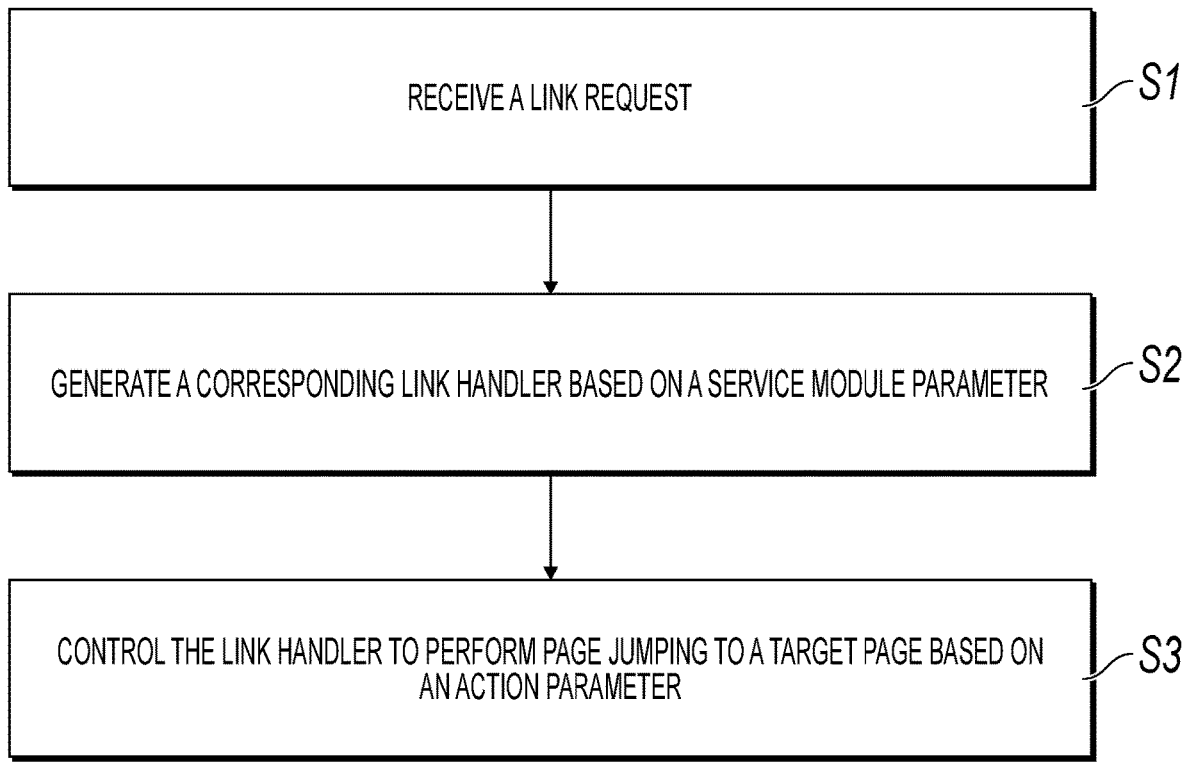
FIG. 1 is a flowchart illustrating a link request processing method, according to an implementation of the present disclosure.

A link request processing method and apparatus according to the implementations of the present disclosure are described below with reference to the accompanying drawings. FIG. 1 is a flowchart illustrating a link request processing method, according to an implementation of the present disclosure.

As shown in FIG. 1, the link request processing method can include the following steps. S1, receive a link request. The link request can include a service module parameter and an action parameter.

In an implementation of the present disclosure, the link request can be generated by using an external application (APP) such as a browser, by using an internal service module, or through information pushing. S2, generate a corresponding link handler based on the service module parameter. Specifically, a reflection interface provided by a client terminal can be invoked based on the service module parameter, to generate the link handler. For example, if a link is scheme://domain/model=modulelA&action=action1, a corresponding link handler ModuleALinkHandler can be generated based on a service module parameter modulelA. In addition, a predetermined configuration file or configuration table can be queried based on the service module parameter to determine the corresponding link handler. The service module parameter is stored in the predetermined configuration file or configuration table. For example, one piece of content in a configuration file LinkRule.json in a JSON format can be {moduleA:ModuleALinkHandler}. When the service module parameter in the received link request is the modulelA, the configuration file LinkRule.json can be queried to determine that the corresponding link handler is ModuleALinkHandler.

S3, control the link handler to perform page jumping to a target page based on the action parameter.

Specifically, a reflection interface provided by a client terminal can be invoked based on the service module parameter and the action parameter to obtain the target page, and the link handler is controlled to jump to the target page. For example, after the corresponding link handler ModuleALinkHandler is generated based on the service module parameter modulelA, the link handler ModuleALinkHandler can be controlled based on an action parameter action1, to jump to a target page, that is, a page corresponding to scheme://domain/model=modulelA&action=action1. The previous process of parsing a link by using a reflection method to determine the link handler ModuleALinkHandler corresponding to the modulelA, and using the link handler ModuleALinkHandler to process a corresponding link request based on the action parameter action1 forms a link routing algorithm. In the implementation of the present disclosure, coupling can be eliminated by using the link routing algorithm and a page naming convention without introducing a related service module.

In addition, a corresponding link can also be automatically assigned to a newly added service. A corresponding link handler can be determined and a corresponding page can be jumped to by using the previous method.

It should be understood that the link handler is a segment of program code, and is used to process page jumping. Certainly, the link handler may be implemented based on hardware implementations.

In addition, a predetermined configuration file or configuration table can be queried based on the service module parameter and the action parameter to obtain the target page, and the link handler is controlled to jump to the target page. For example, after a configuration file LinkRule.json is queried and a corresponding link handler is determined as ModuleALinkHandler, a configuration file, such as {action1: ModelAAction1ViewController}, can further be queried, and the link handler is controlled based on an action parameter Action1 to jump to a target page.

Based on the link request processing method in the implementation of the present disclosure, the link request is received, the corresponding link handler is generated based on the service module parameter in the link request, and the link handler is controlled to perform page jumping based on the action parameter to jump to the target page. Therefore, the problem that a link request processing procedure can be complicated during hardcoding is resolved, and a coupling file does not need to be readjusted for newly added services. Operations are simplified and made more convenient.

To achieve the previous objective, the present disclosure further discloses a link request processing apparatus.

Figure 2:
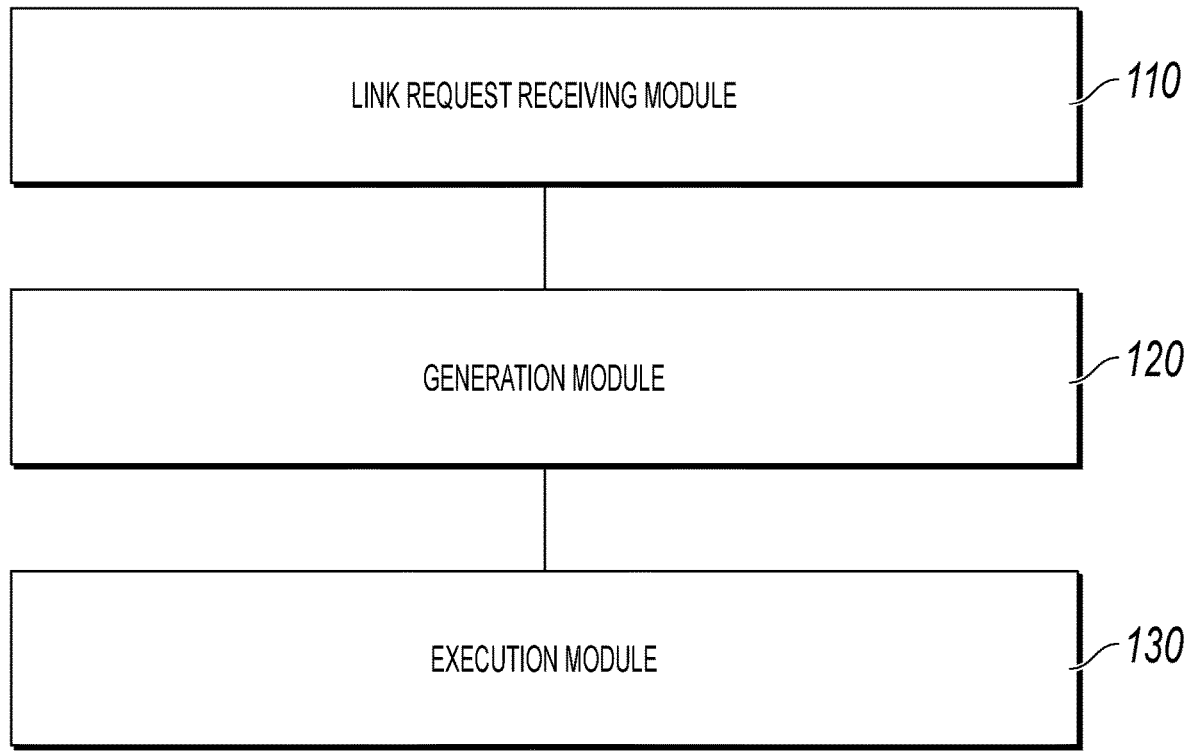
FIG. 2 is a schematic structural diagram illustrating a link request processing apparatus, according to an implementation of the present disclosure.

FIG. 2 is a schematic structural diagram illustrating a link request processing apparatus, according to an implementation of the present disclosure. As shown in FIG. 2, the link request processing apparatus can include a link request receiving module 110, a generation module 120, and an execution module 130.

Specifically, the link request receiving module 110 can be configured to receive a link request. The link request can include a service module parameter and an action parameter. In an implementation of the present disclosure, the link request can be generated by using an external APP such as a browser, by using an internal service module, or through information pushing.

The generation module 120 can be configured to generate a corresponding link handler based on the service module parameter.

Specifically, the generation module 120 can invoke a reflection interface provided by a client terminal based on the service module parameter, to generate the link handler. For example, if a link is scheme://domain/model=module1A&action=action1, a corresponding link handler ModuleALinkHandler can be generated based on a service module parameter module1A.

In addition, the generation module 120 can query a predetermined configuration file or configuration table based on the service module parameter to determine the corresponding link handler. The service module parameter is stored in the predetermined configuration file or configuration table. For example, one piece of content in a configuration file LinkRule.json in a JSON format can be {moduleA:ModuleALinkHandler}. When the service module parameter in the received link request is the module1A, the configuration file LinkRule.json can be queried to determine that the corresponding link handler is ModuleALinkHandler.

The execution module 130 can be configured to control the link handler to perform page jumping to a target page based on the action parameter.

Specifically, the execution module 130 can invoke a reflection interface provided by a client terminal based on the service module parameter and the action parameter, to obtain the target page, and control the link handler to jump to the target page. For example, after the corresponding link handler ModuleALinkHandler is generated based on the service module parameter module1A, the link handler ModuleALinkHandler can be controlled based on an action parameter action1, to jump to a target page, that is, a page corresponding to scheme://domain/model=module1A&action=action1. The previous process of parsing a link by using a reflection method to determine the link handler ModuleALinkHandler corresponding to the module1A, and using the link handler ModuleALinkHandler to process a corresponding link request based on the action parameter action1 forms a link routing algorithm.

In the implementation of the present disclosure, coupling can be eliminated by using the link routing algorithm and a page naming convention without introducing a related service module.

In addition, a corresponding link can also be automatically assigned to a newly added service. A corresponding link handler can be determined and a corresponding page can be jumped to by using the previous method.

It should be understood that the link handler is a segment of program code, and is used to process page jumping. Certainly, the link handler may be implemented based on hardware implementations.

In addition, the execution module 130 can query a predetermined configuration file or configuration table based on the service module parameter and the action parameter to obtain the target page and control the link handler to jump to the target page. For example, after a configuration file LinkRule.json is queried and a corresponding link handler is determined as ModuleALinkHandler, a configuration file, such as {action1: ModelAAction1ViewController}, can be further queried, and a page of the link handler is controlled based on an action parameter Action1 to jump to a target page.

The link request processing apparatus in the implementation of the present disclosure receives the link request, generates the corresponding link handler based on the service module parameter in the link request, and controls the link handler to perform page jumping to the target page based on the action parameter. Therefore, the problem that a link request processing procedure can be complicated during hardcoding is resolved, and a coupling file does not need to be readjusted for newly added services. Operations are simplified and made more convenient.

To achieve the previous objective, the present disclosure further discloses a link generation method.

Figure 3:
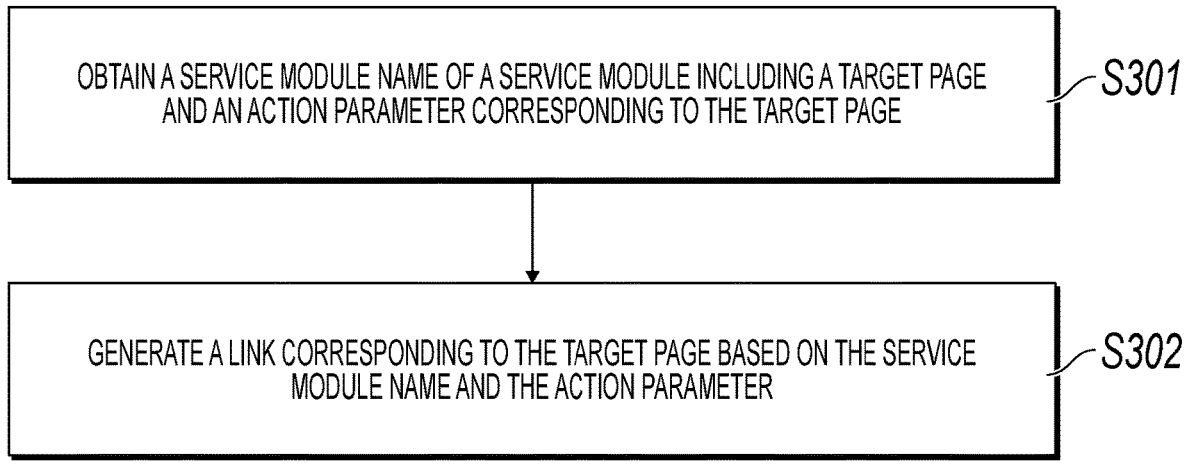
FIG. 3 is a flowchart illustrating a link generation method, according to an implementation of the present disclosure.

FIG. 3 is a flowchart illustrating a link generation method, according to an implementation of the present disclosure.

As shown in FIG. 3, the link generation method can include the following steps.

S301, obtain a service module name of a service module including a target page and an action parameter corresponding to the target page.

Different service modules can have different service module names.

S302, generate a link corresponding to the target page based on the service module name and the action parameter.

For example, a predetermined format used for generating a link corresponding to a target page is scheme://domain/?module={ModuleName}&action={ActionType}. A service module name is module={ModuleName}, and an action parameter is action={ActionType}. A service module name ModuleA of a service module including the target page and an action parameter action1 corresponding to the target page can be substituted into the predetermined format. The link corresponding to the target page is scheme://domain/?module=ModuleA&action=action1.

Based on the link generation method in the implementation of the present disclosure, the service module name of the service module including the target page and the action parameter corresponding to the target page are obtained, and the link corresponding to the target page is generated based on the service module name and the action parameter. As such, the corresponding link can be automatically generated for the target page. Operations can be made convenient and simplified.

To achieve the previous objective, the present disclosure further proposes a link generation apparatus.

Figure 4:
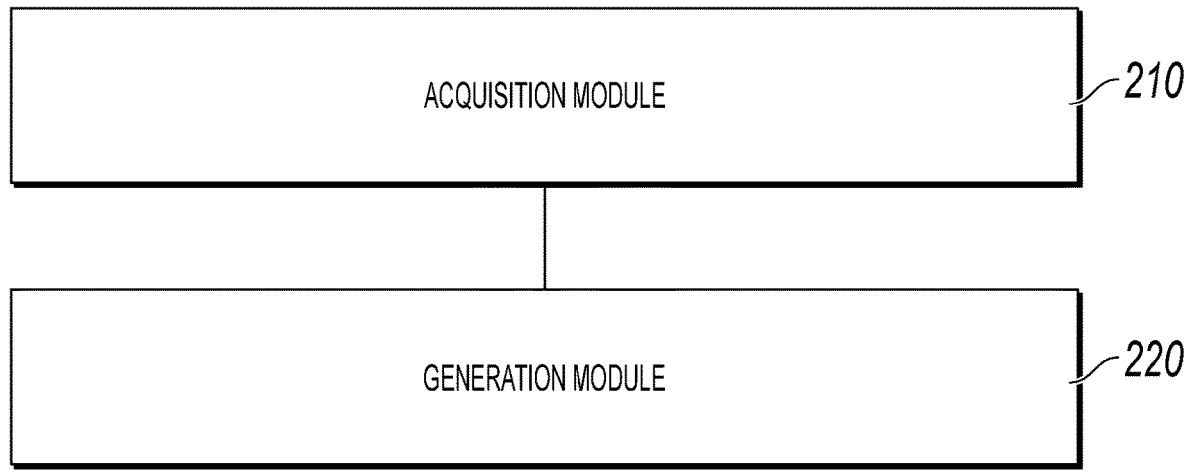
FIG. 4 is a schematic structural diagram illustrating a link generation apparatus, according to an implementation of the present disclosure.

FIG. 4 is a schematic structural diagram illustrating a link generation apparatus, according to an implementation of the present disclosure.

As shown in FIG. 4, the link generation apparatus can include an acquisition module 210 and a generation module 220.

The acquisition module 210 can be configured to obtain a service module name of a service module including a target page and an action parameter corresponding to the target page.

Different service modules can have different service module names.

The generation module 220 can be configured to generate a link corresponding to the target page based on the service module name and the action parameter.

For example, a predetermined format used for generating a link corresponding to a target page is scheme://domain/?module={ModuleName}&action={ActionType}. A service module name is module={ModuleName}, and an action parameter is action={ActionType}. The generation module 220 can substitute, into the predetermined format, a service module name ModuleA of a service module including the target page and an action parameter action1 corresponding to the target page. The link corresponding to the target page is scheme://domain/?module=ModuleA&action=action1.

The link generation apparatus in the implementation of the present disclosure obtains the service module name of the service module including the target page and the action parameter corresponding to the target page, and generates the link corresponding to the target page based on the service module name and the action parameter. As such, the corresponding link can be automatically generated for the target page. Operations can be made convenient and simplified.

In the descriptions of the present disclosure, it should be understood that, directions or positional relationships indicated by terms "center", "longitudinal", "transverse", "length", "width", "thickness", "above", "below", "in front of", "behind", "left", "right", "vertical", "horizontal", "top", "bottom", "inside", "outside", "clockwise", "counterclockwise", "axial", "radial", "circumferential", etc. are based on orientations or positional relationships shown in the accompanying drawings, and they are used only for describing the present disclosure and for description simplicity, but do not indicate or imply that an indicated apparatus or element need to have a specific orientation or be constructed and operated in a specific orientation. Therefore, it does not constitute a limitation on the present disclosure.

In addition, the terms "first" and "second" are merely intended for a purpose of description, and shall not be understood as an indication or implication of relative importance or implicit indication of the number of indicated technical features. Therefore, a feature limited by "first" or "second" can explicitly or implicitly include at least one such feature. In the descriptions about the present disclosure, "a plurality of" means at least two, for example, two or three, unless otherwise specified.

In the present disclosure, terms "install" "link", "connect", "fix", etc. should be understood in a broad sense unless otherwise definitely stipulated or limited. For example, a connection may be a fixed connection, a detachable connection, or an integrated connection; may be a mechanical connection or an electrical connection; and may be a direct connection, an indirect connection through an intermediate medium, or a connection inside two components or interaction between two components. For a person of ordinary skill in the art, specific meanings of the previous terms in the present disclosure can be understood based on a specific situation.

In the present disclosure, unless otherwise specified, a first feature "above" or "below" a second feature can mean direct contact between the first feature and the second feature, or indirect contact between the first feature and the second feature through an intermediate medium.

In addition, that the first feature is "above" the second feature can mean that the first feature is right above or diagonally above the second feature, or simply indicate that the first feature is at a higher position than the second feature.

That the first feature is "below" the second feature can mean that the first feature is right below or diagonally below the second feature, or simply indicate that the first feature is at a lower position than the second feature. In descriptions in the present specification, descriptions about such reference terms as "an implementation", "some implementations", "an example", "a specific example", and "some examples" mean that specific features, structures, materials, or characteristics described with reference to the implementations or examples are included in at least one implementation or example of the present disclosure. In the present specification, the previous example expressions of the terms are not necessarily for a same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples described in the present specification, provided that they do not conflict with each other.

Although the implementations of the present disclosure are shown and described above, it can be understood that the previous implementations are examples and cannot be construed as a limitation on the present disclosure, and a person of ordinary skill in the art can make changes, modifications, replacement, and variations to the previous implementations within the scope of the present disclosure.

Figure 5:
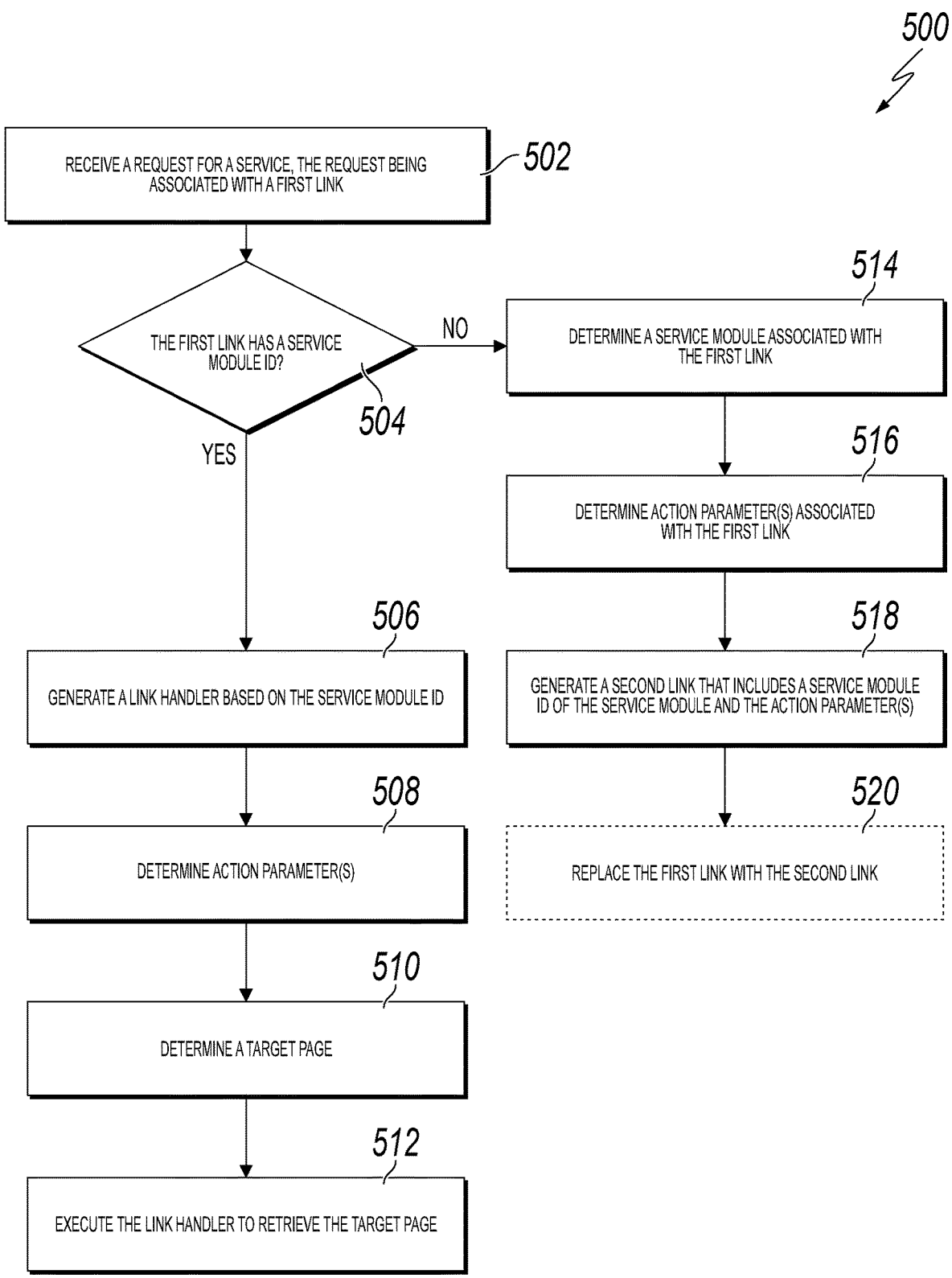
FIG. 5 is a flowchart illustrating an example of a computer-implemented method for processing link request, according to an implementation of the present disclosure.

FIG. 5 is a flowchart illustrating an example computer-implemented method for processing link request, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a request for a service is received. The request is associated with a first link. For example, the request can be in form of a first link. The request (or the first link) can be received in an information pulling procedure, for example, in response to a user interaction with a computing device. For example, the request may be transmitted in response to a selection of an online icon. As an example, a link may be Shopping://retail/module=AMAZON&action=ItemA, where the Shopping is a scheme, retail is a domain, AMAZON is a service module, and ItemA is an action parameter. The request can be received by the link request receiving module 110 of FIG. 2. From 502, method 500 proceeds to 504.

At 504, a determination is made as to whether the first link includes a service module identifier (ID). The service module (and/or an action parameter in the first link) can be determined by parsing the first link. In some implementations a determination is made as to whether the first link includes a valid service module ID. For example, if the service module ID of the first link corresponds to an old service module that is no longer active, the first link may be considered as not having a service module ID. If it is determined that the first link has a service module ID, method 500 proceeds to 506. Otherwise, if it is determined that the first link does not include a service module ID, method 500 proceeds to 514.

The service module ID can be associated with a service provider (or a service module) that provides the requested service. Examples of the service provider module include, but are not limited to, an address, a name, or a code associated with the service provider. For example, the requested service may be shopping of a merchandise and the service module may be an identification of a service provider (e.g., an online shopping provider such as AMAZON) of the merchandise.

At 506, a link handler is generated based on the service module ID. In some implementations, the link handler is generated based on the service module ID and an action parameter of the first link. The link handler is a segment of a program code that when executed retrieves a target page associated with the requested service. The link handler may be implemented based on hardware implementations of the client device. For example, a link handler for a smart phone may differ from a link handler for a laptop. In some implementations, the link handler is determined by a reflection interface. The reflection interface can be provided by a client device. The client device can be a user computing device on which the request is submitted. The reflection interface can generate the link handler, for example, based on a set of predetermined computer programs (or codes) stored in the client device. In some implementations, the link handler is obtained (or determined) by querying a configuration file or a configuration table that associates (e.g., maps) one or more service modules with one or more link handlers. Determination, generation, or obtaining of the link handler can be performed by the generation module 120 of FIG. 2. From 506, the method 500 moves to 508.

At 508, one or more action parameters associated with the request is determined. The first link can include one or more action parameters that can be determined, for example, by parsing the first link. An action parameter can indicate one or more constraints on how to respond to the service request. For example, one or more action parameters can control one or more constraint of the link handler for retrieving the target page. The one or more constraints can include one or more actions to be performed. The actions may include opening a page or a part of a page, contacting (e.g., sending an email to) a third party, opening a popup page, etc. The actions may include applying one or more restrictions (e.g., based on age, geographical location, date, etc.) on the contents of a page associated with the requested service. The one or more constraints can be details of the requested service. For example, the constraints can be specifications of a merchant (e.g., Seller A) or a merchandise (e.g., an item such as a purse, a book, etc.) in the shopping website. In some examples, the constraints may include data associated with date, format, or information of the requested service. In the shopping merchandise example, the action can specify particular discounts, holiday pricings, or sales associated with geographical locations of the requesting user or the seller (or both).

At 510, a target page associated with the requested service is determined. The target page is determined based on the service module and the action parameter. For example, a target page may be a web page associated with sale of a merchandise by an online shopping service provider. In some implementations, the target page can be determined by a reflection interface provided by the client terminal. In some implementations, the target page can be determined by querying a predetermined configuration file or table that stores one or more pages associated with one or more service module IDs. The target page can be queried based on the service module ID and/or the action parameter. From 510, method 500 proceeds to 512.

At 512, the link handler is executed to retrieve the target page. The link handler is executed based on the action parameter. The action parameter can control the link handler in retrieving the target page. The action parameter can direct the link handler on what needs to be done with the target page. For example, the action parameter may direct the link handler to open the target page. The action parameter can restrict (e.g., directs, limits) the link handler execution to retrieving particular format and/or parts of the target page. For example, based on a geographical location (e.g., of the client page requesting the service), the service provider may provide different formats (e.g., different pricing units) of a target page. The action parameter can control the link handler execution by retrieving of the one or more formats associated with the geographical location for a respective target page. Retrieving of the target page can be performed by the execution module 130 of FIG. 2.

If the first link does not include a service module ID, method 500 proceeds from 504 to 514. At 514, a service module associated with the first link is determined. For example, the first link may include one or more fields (e.g., codes, invalid service module ID, etc.) associated with the service module. The first link can be parsed to determine the fields. Based on the fields, a service module associated with the first link is determined. For example, the service module may be obtained by querying a configuration table or file based on the one or more fields to determine the service module. Upon determining the service module, a service module ID (e.g., a name, a code, etc.) associated with the service module is determine. The service module can be determined by the acquisition module 210 of FIG. 4. From 514, method 500 proceeds to 516.

At 516, an action parameter associated with the first link is determined. The action parameter can be determined as explained in 508. For example, the action parameter can be determined by parsing the first link. In some implementations, if it is determined that the action parameter is associated with an invalid action (e.g., is outdated), a valid action associated with the request can be determined. For example, an up-to-date action associated with the service module and the request can be determined as the action parameter in 516. The action parameter can be determined by the acquisition module 210 of FIG. 4. From 516, method 500 proceeds to 518.

At 518, a second link is generated. The second link includes the service module ID and the action parameter determined in 514 and 516, respectively. The second link can be generated according to a predetermined format. One format can be scheme://domain/module={ServiceModuleID}&action={ActionParameter}, where {ServiceModuleID} includes a respective service module ID and the {ActionParameter} includes one or more action parameters corresponding to the request. The second link can be an updated version of the first link; updated based on the service module determined in 514, and the action parameter determined in 516. The second link can be a link of (or corresponding to) the target page. The second link can be generated by the generation module 220 of FIG. 4. From 518, method 500 proceeds to 506. Optionally, the method 500 can proceed from 518 to 520 as well.

At 520, the first link is replaced with the second link. Accordingly, the replaced first link includes an up to date service module ID and an up to date action parameter.

Conventionally, a link request (e.g., an online request or link) is processed based on fields hardcoded on the link. To determine a service module associated with the fields of the link, a coupling file is queried to determine a header file for the service module. The header file is then executed to create a link handler for retrieving a page associated with the service module. This procedure is too complicated. In addition, since the fields are hardcoded in the link, for each new service the coupling file needs to be readjusted.

Implementations of the present disclosure reduce the complexity associated with the conventional procedure and eliminate readjustment issues corresponding to hardcoding of the fields in the link. According to the implementations of the present disclosure, a link includes a service module ID associated with the requested service. Thus, a need for querying a coupling file to determine the service module is eliminated and the link handler can be generated based on the service module ID that is included in the link. Further, the links can easily be readjusted for new services. For example, the implementations provide methods for generating links based on the service module and action parameters associated with the requested service. For example, an old link can be updated by generating a new link that includes updated service module and/or action parameter.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
    receiving, by the one or more processors in response to a user interaction with a computing device, a link for retrieving a target page corresponding to a service, the link including an action parameter that indicates an action that is to be executed in response to receiving the target page, wherein the action includes applying one or more constraints on contents of the target page;
    determining, by the one or more processors, that the link includes a service module identifier that identifies a service provider that provides the service;
    in response to determining that the link includes the service module identifier:
        determining, by the one or more processors, the target page based on the service module identifier and the action parameter;
        generating, by the one or more processors, a link handler based on the service module identifier and the action parameter included in the received link, wherein the link handler is a segment of a program code that is configured, when executed, to retrieve the target page based on the action parameter; and
        executing, by the one or more processors, the link handler based on the action parameter to retrieve the target page, wherein the retrieved target page includes contents according to the one or more constraints associated with the action parameter included in the received link.

2. The computer-implemented method of claim 1, wherein at least one of the service module identifier and the action parameter are determined by parsing the link, wherein the link is a web-link, wherein the link handler is a segment of a program code that when executed retrieves the target page, and wherein the user interaction with the computing device is selection of an online icon on a browser of the computing device.

3. The computer-implemented method of claim 1, wherein the generating of the link handler comprises:
    querying a configuration file based on the service module identifier to determine the link handler, the configuration file storing one or more link handlers mapped to one or more service modules.

4. The computer-implemented method of claim 1, wherein the determining of the target page comprises:
    querying a configuration file based on the service module identifier and the action parameter to determine the target page, the configuration file mapping one or more pages with one or more service module identifiers and one or more action parameters.

5. The computer-implemented method of claim 1, further comprising determining, by the one or more processors, that the link lacks a valid service module identifier, and in response:
    determining a valid service module identifier associated with the link, and
    generating another link corresponding to the target page, the other link including the valid service module identifier.

6. The computer-implemented method of claim 5, wherein the link includes an action parameter associated with the link.

7. The computer-implemented method of claim 1, wherein the action parameter controls a constraint of the link handler for retrieving the target page, wherein the action is at least one of opening a page, opening a part of a page, sending an email to a third party, and opening a popup page.

8. A non-transitory, computer-readable medium storing one or more instructions executable by a computer system to perform operations comprising:
    receiving, in response to a user interaction with a computing device, a link for retrieving a target page corresponding to a service, the link including an action parameter that indicates an action that is to be executed in response to receiving the target page, wherein the action includes applying one or more constraints on contents of the target page;
    determining that the link includes a service module identifier that identifies a service provider that provides the service;
    in response to determining that the link includes the service module identifier:
        determining the target page based on the service module identifier and the action parameter;
        generating a link handler based on the service module identifier and the action parameter included in the received link, wherein the link handler is a segment of a program code that is configured, when executed, to retrieve the target page based on the action parameter; and
        executing the link handler based on the action parameter to retrieve the target page, wherein the retrieved target page includes contents according to the one or more constraints associated with the action parameter included in the received link.

9. The non-transitory computer-readable medium of claim 8, wherein at least one of the service module identifier and the action parameter are determined by parsing the link, wherein the link is a web-link, wherein the link handler is a segment of a program code that when executed retrieves the target page.

10. The non-transitory computer-readable medium of claim 8, wherein the generating of the link handler comprises:
    querying a configuration file based on the service module identifier to determine the link handler, the configuration file storing one or more link handlers mapped to one or more service modules.

11. The non-transitory computer-readable medium of claim 8, wherein the determining of the target page comprises:
    querying a configuration file based on the service module identifier and the action parameter to determine the target page, the configuration file mapping one or more pages with one or more service module identifiers and one or more action parameters.

12. The non-transitory computer-readable medium of claim 8, further comprising one or more instructions executable to perform determining that the link lacks a valid service module identifier, and in response:
   determining a valid service module identifier associated with the link, and
   generating another link corresponding to the target page, the other link including the valid service module identifier.

13. The non-transitory computer-readable medium of claim 12, wherein the link includes an action parameter associated with the link.

14. The non-transitory computer-readable medium of claim 8, wherein the action parameter controls a constraint of the link handler for retrieving the target page, wherein the action is at least one of opening a page, opening a part of a page, sending an email to a third party, and opening a popup page.

15. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving, in response to a user interaction with a computing device, a link for retrieving a target page corresponding to a service, the link including an action parameter that indicates an action that is to be executed in response to receiving the target page, wherein the action includes applying one or more constraints on contents of the target page;
      determining that the link includes a service module identifier that identifies a service provider that provides the service;
      in response to determining that the link includes the service module identifier:
         determining the target page based on the service module identifier and the action parameter;
         generating a link handler based on the service module identifier and the action parameter included in the received link, wherein the link handler is a segment of a program code that is configured, when executed, to retrieve the target page based on the action parameter; and
      executing the link handler based on the action parameter to retrieve the target page, wherein the retrieved target page includes contents according to the one or more constraints associated with the action parameter included in the received link.

16. The computer-implemented system of claim 15, wherein at least one of the service module identifier and the action parameter are determined by parsing the link, wherein the link is a web-link, wherein the link handler is a segment of a program code that when executed retrieves the target page.

17. The computer-implemented system of claim 15, wherein the generating of the link handler comprises:
   querying a configuration file based on the service module identifier to determine the link handler, the configuration file storing one or more link handlers mapped to one or more service modules.

18. The computer-implemented system of claim 15, wherein the determining of the target page comprises:
   querying a configuration file based on the service module identifier and the action parameter to determine the target page, the configuration file mapping one or more pages with one or more service module identifiers and one or more action parameters.

19. The computer-implemented system of claim 15, further configured to determine that the link lacks a valid service module identifier, and in response:
   determining a valid service module identifier associated with the link, and
   generating another link corresponding to the target page, the other link including the valid service module identifier.

20. The computer-implemented system of claim 19, wherein the link includes an action parameter associated with the link.

* * * * *